Oct. 22, 1929.  A. M. THOMPSON  1,732,290
REENFORCED CONCRETE FENCE POST
Filed March 22, 1927
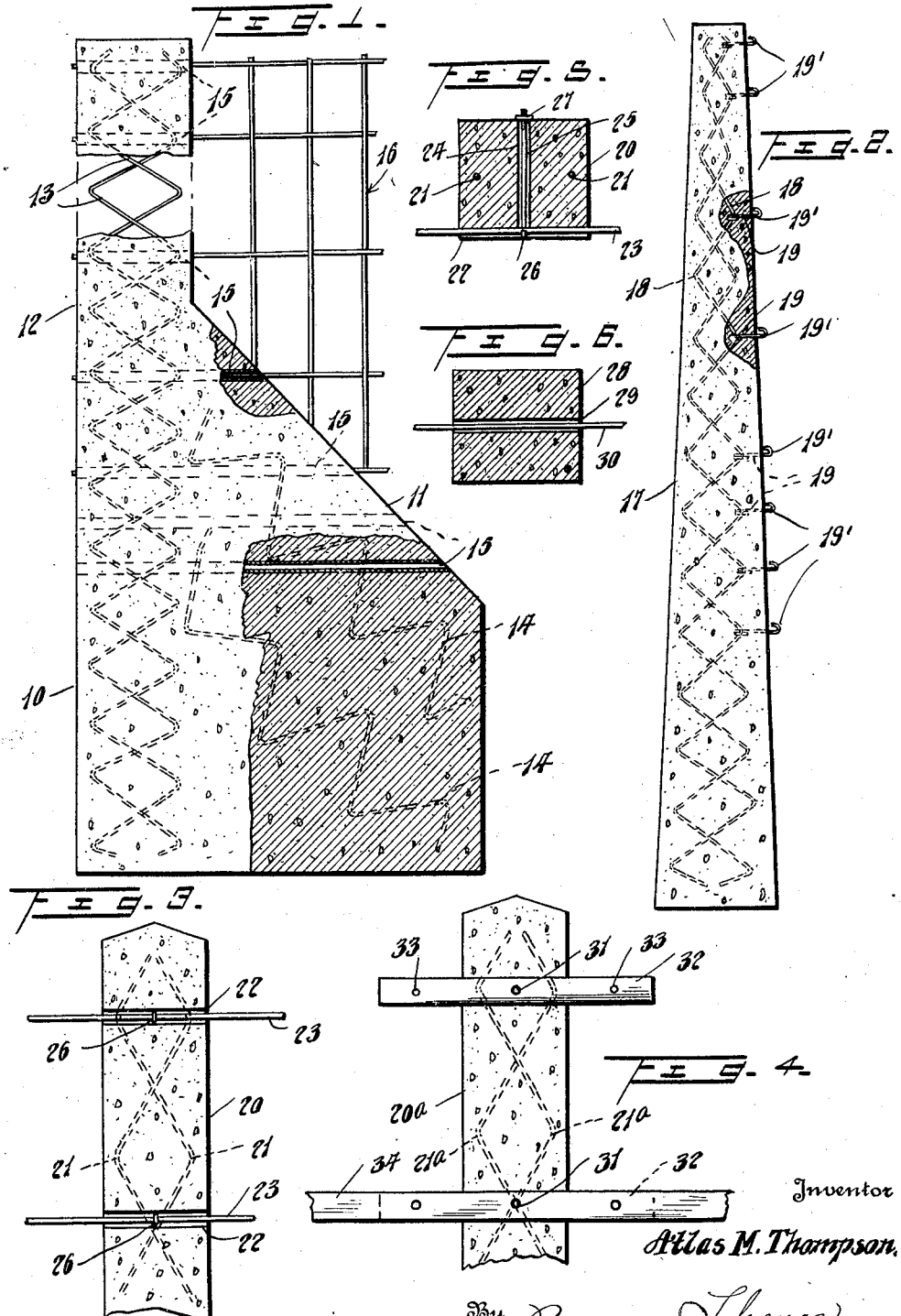
Inventor
Atlas M. Thompson,
By Bacon & Thomas
Attorney

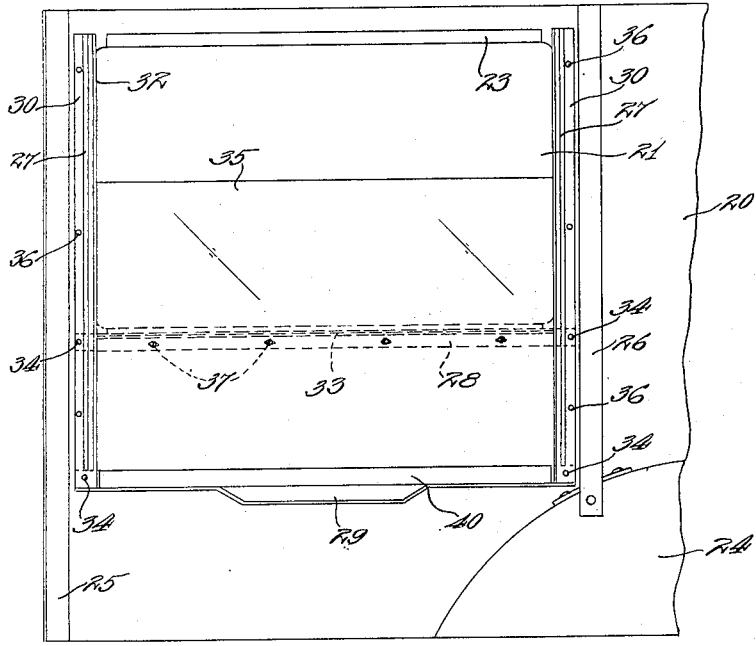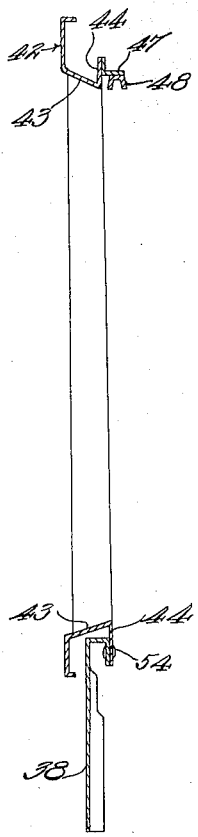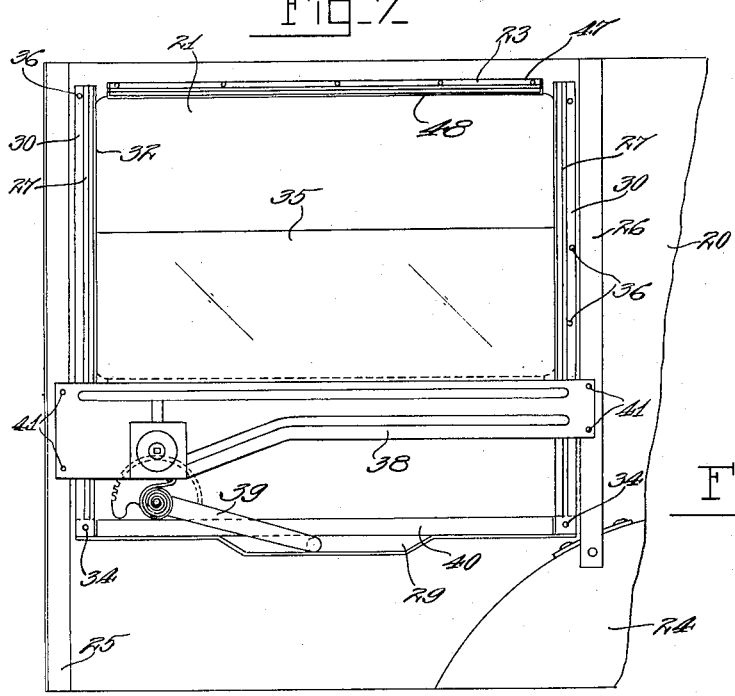

Oct. 22, 1929. M. H. TONCRAY 1,732,291
WINDOW ASSEMBLY
Filed March 6, 1926   3 Sheets-Sheet 3

INVENTOR
Millard H. Toncray
by Mason, Calvo, Copeland & Pike
Attys.

Patented Oct. 22, 1929

1,732,291

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

WINDOW ASSEMBLY

Application filed March 6, 1926. Serial No. 92,888.

This invention relates to windows for closed automobile bodies and is in the nature of a modification of the invention disclosed and claimed in another application filed November 30, 1925, Serial No. 72,215.

The invention has for its general object to provide an improved window construction whereby the assembly of the parts constituting and associated with the window is facilitated and cheapened and the quality of the work improved. In common with that forming the subject matter of the application above referred to, the present invention in its preferred form contemplates a construction wherein the window glass and the guides therefore may be assembled at the bench in the form of a sub-assembly which may thereafter be applied as a unit to the main body assembly, thereby saving time and space on the main assembly or trim line, and affording an increased convenience, accuracy of work, and facility of inspection incidental to bench assembly methods, and also permitting the accurate relative location of the parts, thereby ensuring the proper fitting of the window glass in its guides. As distinguished from the construction described and claimed in said other application, the present invention contemplates a construction in which the several parts or sub-assemblies which are applied to the body at the trim line are all relatively small, light, and simple, whereby their handling and application to the body are facilitated.

The foregoing and other objects of the invention, together with means whereby the latter may be carried into effect, will best be understood from the following description of one form thereof illustrated in the accompanying drawings. It will be understood, however, that the particular construction described and shown has been chosen for purposes of exemplification merely, and that the invention, as defined by the claims hereunto appended, may be otherwise embodied without departure from the spirit and scope thereof.

In said drawings:

Fig. 1 is an elevation of the sub-assembly comprising the window guides and cross members.

Figs. 2, 3 and 4 are enlarged detail sections taken substantially on the lines 2—2, 3—3 and 4—4, respectively, Fig. 1.

Fig. 5 is a view similar to Fig. 2 showing a glass run in place in a window guide.

Fig. 6 is a view similar to Fig. 1 showing the window glass in place in the guides.

Fig. 7 is a fragmentary interior view of the body showing the sub-assembly illustrated in Fig. 6 in place therein.

Fig. 8 is an elevation of the regulator board with the operating mechanism assembled therewith.

Fig. 9 is a view similar to Fig. 7 showing the regulator board in place.

Fig. 10 is an enlarged vertical section of the inside window frame showing the window header secured thereto.

Figures 11, 12, 13:
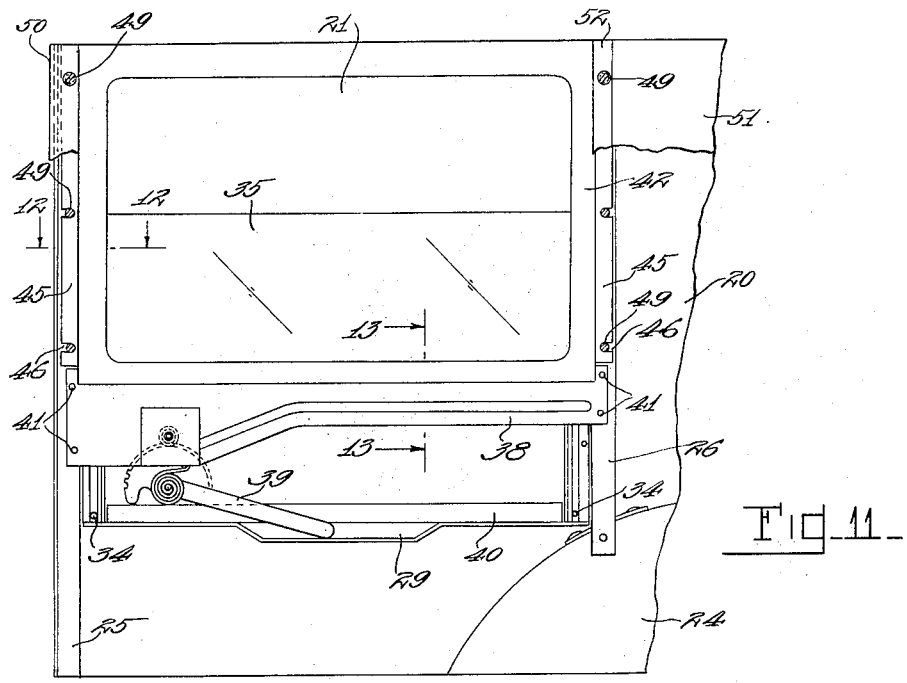
Fig. 11 is a view similar to Figs. 7 and 9 showing the complete window assembly in place.

Figs. 12 and 13 are enlarged detail sectional views taken substantially on the line 12—12 and 13—13, respectively, Fig. 11.

Fig. 14 is a vertical sectional view through the inside window frame and regulator board illustrating a modification.

The invention is herein shown as embodied in a quarter window assembly designed for use in connection with an automobile body construction in accordance with principles more fully explained in another application filed November 20, 1925, Serial No. 70,298, although it will be understood the precise construction of the main body assembly may be widely varied. In Figs. 7, 9 and 11 is shown the interior of the quarter or rear side portion of such a body, the same being composed of suitable outside panelling 20 having a window opening 21. At the sides and bottom (and preferably also at the top) of the window opening the paneling is formed with inturned flanges 22 (see particularly Figs. 12 and 13) which terminate in portions 23 lying in a plane substantially parallel with the plane of the paneling. Said panelling is also formed or provided with an inset wheel house 24 and has secured thereto certain uprights including a door post or pillar 25 in front of the window opening 21 and a quarter brace or pillar 26 located at the rear of said window opening and extending upwardly from the wheel house 24.

Referring particularly to Figs. 1 and 4, the window assembly includes a pair of window guides 27 which are spaced and connected by two cross members 28 and 29. The window guides 27 are preferably of the cross sectional form shown most clearly in Figs. 2 and 4 and include portions or flanges 30 adapted for attachment to the portions 23 of the side window flanges 22 and portions 31 adapted to retain rubber or similar window glass runs 32 (Figs. 5 and 12) and clamp the latter against said flange portions 23. The cross member 28 carries a weather strip 33 and connects the window guides 27 intermediate their ends and at a level substantially opposite the bottom of the window opening 21 when the parts are in place. The cross member 29 connects the guides 27 at their lower ends. In practice, the guides 27 and cross members 28 and 29 are assembled at the bench and the ends of said cross members suitably secured to said guides, as by rivets 34. The parts may be enameled or otherwise finished either before or after they are assembled with each other, after which the glass runs 32 may be slipped into the guides 27 and the window glass 35, with a reinforcing channel 40 on the bottom edge thereof, inserted from the top. The cross members 28 and 29 hold the window guides 27 properly spaced and positioned and form a window sub-assembly which, with the window glass 35, may be inspected and tested for working fits before being carried to the main assembly or body trim line. This sub-assembly may then be applied to the body as shown in Fig. 7, the flanges 30 of the guides 27 being secured to the portions 23 of the panel window flanges 22 by bolts 36, and the cross member 28 being secured to the portion 23 of the bottom window flange by bolts 37 which pass through holes 371 in said cross member. The window guides 27 extend below the side window flanges 22 but are connected and braced by the cross member 29. The window glass 35 slides freely in the guides past the cross member 28 and weather strip 33 in engagement with the latter to open and close the window.

After the placing of the window sub-assembly above described, the window operating mechanism may be applied. This mechanism is carried by a regulator board 38 (see Fig. 8) and may be of any approved type, said mechanism having an arm 39 which engages the reinforcing channel 40 on the bottom of the window glass 35. The regulator board 38 is secured at its ends, as by bolts 41, to the pillars 25 and 26, respectively, and the arm 39 engaged with the channel 40 of the window glass.

After the application of the regulator board 38, the portion of the window assembly above the latter is covered by an inside window frame 42 (Figs. 10 to 13) which preferably comprises a unitary sheet metal stamping having a central opening adapted to register with the window opening 21 and surrounded by an inwardly turned rim 43 having at its inner edge a flange 44 disposed substantially parallel to the face of said frame. At its ends or vertical edges, the frame 42 is formed with laterally extending flanges 45 formed with notches 46, (Fig. 11). A sheet metal retainer 47 for a rubber or other window header 48 may be secured either to the flange 44 at the top of the inside window frame as shown in Fig. 10, or to the top outside panel flange 23 as shown in Fig. 9. The inside window frame 42 is put in place with the flanges 45 engaging the pillars 25 and 26 and is secured thereto together with suitable trim members by screws 49. The trim members comprise a windlace member 50 at the front of the window, and which as shown is of the construction more fully described in another application filed April 8, 1926, Serial No. 100,587, and a trim panel 51 and covering strip 52 at the rear of the window. The windlace member 50 is secured to the pillar 25 by the screws 49 which pass through the slots 46 in the forward window frame flange 45, thereby clamping said flange tightly to said pillar. The strip 52 is similarly secured to the pillar 26 by screws 49 which pass through the slots 46 in the rear window frame flange 45, thereby clamping said flange, together with the forward edge of the quarter trim panel 51, securely to said pillar. At its lower edge the window frame 42 overlaps the regulator board 38 and is spaced therefrom a sufficient distance to receive the upper edge of a bottom trim panel 53, as shown in Fig. 13.

Instead of applying the regulator board and inside window frame to the main body assembly separately, as above described, the upper edge of the former may be secured, as by rivets 54 (Fig. 14), to the flange 44 at the bottom of the latter and the two thereafter secured in place as a unit.

The flange 44 at the bottom of the inside window frame may, if desired, be provided with an inside weather strip 33ᵃ similar to the outside weather strip 33, as shown in Fig. 13.

While the assembly of the window guides with each other and with the window glass prior to their application to the body panel, as above described, is preferred, it may, in some instances, be desirable to assemble them in place by securing them to the panel flanges separately instead of in the form of a sub-assembly.

Having thus described my invention, I claim:

1. In an automobile body, in combination, a panel having a window opening and flanges at the sides of said opening, window guides secured to said flanges and extending beyond the same, and a cross member connecting the free ends of said guides.

2. In an automobile body, in combination, a panel having a window opening and flanges at the sides of said opening, window guides secured to said flanges, a cross member connecting said guides adjacent the bottom of said window opening, a weather strip carried by said cross member, and a window glass mounted to slide in said guides past said weather strip.

3. In an automobile body, in combination, a panel having a window opening and flanges at the sides and bottom of said opening, window guides secured to said side flanges, a cross member connecting said guides and secured to said bottom flange, a weather strip carried by said cross member, and a window glass mounted to slide in said guides past said weather strip.

4. In an automobile body, the combination with body pillars and body paneling having a window opening, of a window guide assembly carried by said paneling independently of said pillars, and a window frame carried by said pillars independently of said paneling and having an opening registering with the window opening in the latter.

5. In an automobile body, the combination with paneling having a window opening, a window guide assembly secured to and carried by said paneling, and a unitary window frame secured in place to said body, enclosing said window guide assembly, and having an opening registering with the window opening in the paneling.

In testimony whereof I affix my signature.

MILLARD H. TONCRAY.